(12) United States Patent
Chambrin et al.

(10) Patent No.: US 7,577,229 B2
(45) Date of Patent: Aug. 18, 2009

(54) METHOD FOR LIMITING THE MAINTENANCE LOADS APPLIED TO A FUEL ASSEMBLY OF A NUCLEAR REACTOR AND FUEL ASSEMBLY

(75) Inventors: Jean-Luc Chambrin, Griselles (FR); Angelo Beati, Lyons (FR); Guy Gentet, Lyons (FR)

(73) Assignee: Areva NP, Courbevoie (FR)

( * ) Notice: Subject to any disclaimer, the term of this patent is extended or adjusted under 35 U.S.C. 154(b) by 0 days.

(21) Appl. No.: 10/583,897

(22) PCT Filed: Dec. 7, 2004

(86) PCT No.: PCT/FR2004/003142

§ 371 (c)(1),
(2), (4) Date: Jun. 20, 2006

(87) PCT Pub. No.: WO2005/071693

PCT Pub. Date: Aug. 4, 2005

(65) Prior Publication Data

US 2007/0189433 A1    Aug. 16, 2007

(30) Foreign Application Priority Data

Dec. 22, 2003    (FR) .................................. 03 15187

(51) Int. Cl.
    *G21C 15/00*    (2006.01)
(52) U.S. Cl. .................. 376/364; 376/442; 376/437; 376/440; 376/441; 376/453
(58) Field of Classification Search ................. 376/364, 376/442, 437, 440, 441, 453
See application file for complete search history.

(56) References Cited

U.S. PATENT DOCUMENTS

| 4,134,790 | A | | 1/1979 | Bevilacqua et al. |
| 4,192,716 | A | * | 3/1980 | Anthony ..................... 376/364 |
| 4,309,251 | A | * | 1/1982 | Anthony et al. ............. 376/446 |
| 4,418,036 | A | * | 11/1983 | Gjertsen et al. ............. 376/438 |
| 4,659,538 | A | * | 4/1987 | Leclercq ..................... 376/364 |
| 6,442,227 | B1 | * | 8/2002 | Iacovino et al. ............. 376/272 |

FOREIGN PATENT DOCUMENTS

| EP | 0 036 820 | 9/1981 |
| FR | 1 346 377 | 12/1963 |
| FR | 2 493 443 | 3/1982 |
| FR | 2 582 137 | 11/1986 |

OTHER PUBLICATIONS

PCT International Search Report PCT/FR2004/003142, mailed Aug. 30, 2005.

* cited by examiner

*Primary Examiner*—Rick Palabrica
(74) *Attorney, Agent, or Firm*—Davidson, Davidson & Kappel, LLC

(57) ABSTRACT

A resilient bush for frictionally engaging a centering pin of the fuel assembly is fixed in each of the through-holes of at least one of the end-pieces of the fuel assembly. The resilient bush comprises an annular member which has a portion for fixing in the hole of the end-piece and resilient arms which are separated by apertures. The flexible arms of the resilient bush comprise, in a free end portion, a supporting surface which projects radially inside the bush whose diameter is smaller than the diameter of a centering pin of the fuel assembly.

9 Claims, 4 Drawing Sheets

METHOD FOR LIMITING THE MAINTENANCE LOADS APPLIED TO A FUEL ASSEMBLY OF A NUCLEAR REACTOR AND FUEL ASSEMBLY

FIELD OF THE INVENTION

The invention relates to a method and a device for limiting the maintenance loads applied to a fuel assembly of a nuclear reactor in order to compensate for the hydraulic thrust of cooling water passing through the fuel assembly during operation in the nuclear reactor.

BACKGROUND INFORMATION

There are known fuel assemblies for nuclear reactors which are cooled by water, and in particular for nuclear reactors which are cooled by pressurized water and which comprise a cluster of fuel rods which are parallel with each other and which are maintained in a framework which is closed at its ends by end-pieces having a transverse direction relative to the axial longitudinal direction of the fuel assembly.

In the case of pressurized water nuclear reactors, the fuel assemblies are generally of parallelepipedal form with a square base of great length, in the axial direction, for example, 4 meters or more, having a cross-section whose side is approximately 0.20 m long. The end-pieces of the fuel assembly are of square form, and one of the end-pieces located at a first end of the fuel assembly which is in the lower portion of the fuel assembly in the reactor during operation constitutes the bottom end-piece and comprises, at each of its corners, a foot which is intended to move into abutment against a core support plate or lower core plate. Two of the feet located along a diagonal of the bottom end-piece are perforated by holes that are intended each to receive a centering pin of the fuel assembly that projects in the vertical direction upwards on the lower core plate. When the fuel assembly is positioned on the lower core plate, the two holes of the bottom end-piece are engaged on two pins of the lower core plate that are intended to bring about the positioning of the fuel assembly perpendicularly relative to holes for the passage of water extending through the lower core plate. The end-piece that is fixed to the second end of the fuel assembly and that is intended to be located in the upper portion when the fuel assembly is positioned in the nuclear reactor core, and that is referred to as the top end-piece, comprises in particular supporting leaf springs at the upper surface thereof and two centering holes at two corners of the square cross-section of the top end-piece. The centering holes of the top end-piece of the fuel assembly are provided in order to receive centering pins projecting under an upper core plate that is intended to rest on the upper portion of the fuel assemblies of the core comprising the supporting leaf springs. The upper plate of the nuclear reactor constitutes the lower portion of the upper internal pieces of equipment of the nuclear reactor which are positioned above the core, after the fuel assemblies have been introduced into the chamber of the nuclear reactor, so as to bring about the maintenance of the fuel assemblies of the core. When the upper core plate is positioned above the fuel assemblies which are arranged in the core of the reactor, the centering pins of the upper plate of the core which are arranged in the region of each of the fuel assemblies are engaged in the centering holes of the top end-piece of the fuel assembly.

The centering pins of the lower core plate and the upper core plate have an engagement portion of frustoconical form and a cylindrical member whose diameter is slightly smaller than the diameter of the centering hole. The centering pins therefore bring about maintenance of the fuel assemblies in the transverse directions perpendicular to the axial longitudinal direction and in the longitudinal direction, whilst at the same time allowing longitudinal displacements in order to absorb differential expansions in the reactor during operation, the fuel assemblies being maintained in the axial direction by the leaf springs which are able to become deformed by flexion. In the reactor during operation, the pressurized cooling water of the nuclear reactor passes through the fuel assemblies in the axial longitudinal direction thereof and consequently subjects them to a hydraulic thrust in the vertical direction upwards which is manifested by loads which are applied to the structure of the fuel assembly and a slight displacement of the fuel assemblies in the axial direction and lateral vibrations. In order to compensate for the hydraulic thrust and to prevent excessively large displacement of the fuel assembly under the action of the hydraulic thrust, it is necessary to provide leaf springs that have powerful characteristics. Such leaf springs apply great compression loads to the structure of the fuel assembly so that it is necessary to provide extremely strong assembly frameworks, those frameworks being subjected to very large loads in the reactor during operation.

In the case of transient phases during which the flow rate of the cooling water is liable to vary rapidly over time, the fuel assembly can further perform oscillations and the bottom end-piece thereof, when the fuel assembly is lowered under the action of the thrust of the leaf springs, may strike the lower core plate, which may bring about wear and damage when fuel assemblies are used in a nuclear reactor for a long time.

It is therefore necessary to limit as much as possible the maintenance loads applied to the fuel assemblies in order to compensate for the hydraulic thrust of the cooling water which passes through the fuel assembly.

FR-A-2,479,535 proposes a device for limiting the effects of the axial hydraulic thrust on the fuel assemblies of a nuclear reactor so as to be able to dispense with the metal supporting springs at the upper portion of the fuel assemblies and to limit the rapid displacements and the resultant mechanical shocks of the fuel assemblies during transient phases. To that end, there are fixed to the end-pieces of the fuel assemblies, tubular housings that project relative to the end-piece in the axial direction and which are closed at an axial end fixed to the end-piece and which are open at the other end thereof in order to receive a centering pin that engages, in a tight or practically tight manner, inside the housing. The housing further comprises a calibrated hole in the region of the end-piece so that, during the axial displacements of a fuel assembly in the nuclear reactor during operation, those displacements are braked and attenuated by water flowing in the calibrated hole. It is further possible to provide, inside the housing, a split bush comprising flexible arms whose inner diameter is slightly smaller than the diameter of the centering finger.

Such a device is complex and requires a substantial modification of the end-pieces of the fuel assembly. In particular, it is very difficult to modify existing fuel assemblies in order to limit the compression effects applied to the structure of the fuel assembly in order to compensate for the hydraulic thrust on the fuel assembly during operation.

SUMMARY

The objective of the present invention is to provide a method for limiting the maintenance loads applied to a fuel assembly of a nuclear reactor in order to compensate for the hydraulic thrust of cooling water passing through the fuel assembly during operation in the nuclear reactor, the fuel assembly comprising a framework that contains a cluster of fuel rods parallel with each other and which is closed at its ends by transverse end-pieces which are perpendicular to the longitudinal direction of the fuel assembly in which the cooling water flows, each of the end-pieces comprising at least two axial through-holes which are intended each to receive a centering pin of a lower core support plate or an upper core plate, that method being able to be performed on new fuel assemblies or on used fuel assemblies so as to be able to use leaf springs that have weaker characteristics and which apply a reduced compression to the fuel assembly, and to limit the displacements or shocks of the fuel assembly in the reactor during operation.

To that end, there is constructed and provided a resilient bush for frictionally engaging a centering pin, for at least one centering hole, of at least one end-piece of the fuel assembly, the resilient bush comprising an annular member having a fixing portion whose outer diameter is at a maximum and at least equal to the diameter of the centering hole of the end-piece, over a portion of the axial length thereof, at least two flexible arms that are separated from each other by at least two apertures of axial direction over the entire length of the bush between the fixing portion and a free axial end of the bush, at which the bush has an outer diameter smaller than the diameter of the centering hole and an annular supporting surface that projects radially inside the bush in the free end portion of the flexible arms whose inner diameter is smaller than the diameter of the centering pins, the holes of the at least one end-piece of the fuel assembly are constructed so as to have a diameter which is substantially equal to the outer diameter of the fixing portion of the resilient bush and a resilient bush is fixed in the hole of the end-pieces of the fuel assembly.

According to specific embodiments:
the resilient bush is fixed in the hole of the end-piece of the fuel assembly by at least one of the following methods: crimping, expansion-rolling, welding, screwing;
resilient bushes are fixed in the through-holes of only one of the end-pieces of the fuel assembly and preferably in the through-holes of the bottom end-piece;
resilient bushes are fixed in the through-holes of each of the top and bottom end-pieces of the fuel assembly;
resilient bushes are constructed whose inner diameter is greater than the diameter of a cylindrical engaging portion of the centering pins in order to take into consideration tolerances with respect to the diameter of the cylindrical engaging portion of the centering pin and the spacing between the centering pins which are intended to be engaged in the end-piece of a fuel assembly;
supporting surfaces of elliptical form and supporting surfaces of circular form are provided for contact with the centering pin at the annular supporting surface inside the bush, in order to optimise contact and friction of a centering pin with the supporting portion of the resilient bush during displacements of the fuel assembly in the vertical direction under the action of the hydraulic thrust.

The invention also relates to a fuel assembly of a nuclear reactor comprising a framework which contains a cluster of fuel rods parallel with each other and that is closed at its ends by transverse end-pieces that are perpendicular to the longitudinal direction of the fuel assembly in which cooling water flows, each of the end-pieces comprising at least two axial through-holes which are intended each to receive a centering pin of a lower core plate or an upper core plate, characterised in that there is fixed, inside the at least one through-hole of at least one of the end-pieces of the fuel assembly, a resilient bush which comprises an annular member which has a fixing portion whose outer diameter is at a maximum and at least equal to the diameter of the through-hole over a portion of the axial length thereof, at least two flexible arms that are separated from each other by at least two apertures of axial direction over the entire length of the bush between the fixing portion and a free end of the bush, having an outer diameter that is smaller than the diameter of the fixing portion and an annular supporting surface which projects radially inside the bush in a free end portion of the flexible arms whose inner diameter is smaller than the diameter of the centering pins which are intended to be introduced in the holes of the end-piece.

The through-holes of the end-piece of the fuel assembly in which a resilient bush is fixed to have a diameter that is substantially greater than the diameter of the centering pins, the diameter of the through-holes being determined by the following equation: $DD=DB+DI-DC$, where $DD$ is the hole diameter of the through-hole of the end-piece, $DI$ is an inner diameter of the flow portion of the resilient bush, $DB$ is the outer diameter of the flexible arms of the bush and $DC$ is the diameter of the internal supporting portion of the resilient arms of the bush, the inner diameter of the flow portion of the resilient bush is greater than the diameter of a centering pin in order to take into consideration the tolerances with respect to the diameter of the centering pins and the spacing of the centering pins which are intended to be introduced in the end-piece of the fuel assembly.

BRIEF DESCRIPTION OF THE DRAWINGS

In order to clearly understand the invention, one embodiment of the method according to the invention and a resilient bush which is used for carrying out the method will now be described by way of example.

FIG. 4A relates to a first construction variant and FIG. 4B relates to a second construction variant.

DETAILED DESCRIPTION

Figure 1:
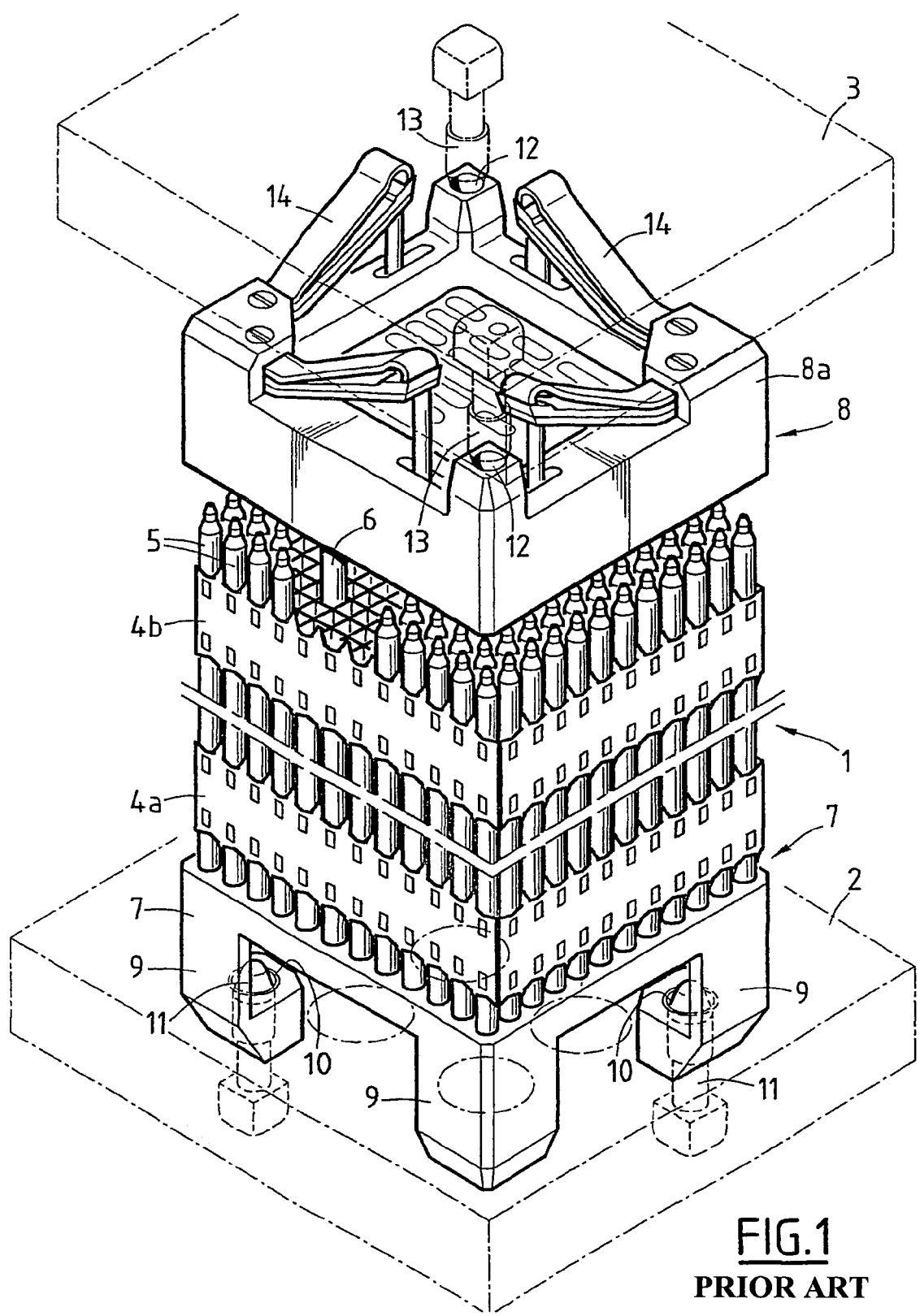
FIG. 1 is a perspective view of a fuel assembly of a pressurized water nuclear reactor in an operative position in the core of the nuclear reactor between a lower core plate and an upper core plate.

FIG. 1 illustrates a fuel assembly of a nuclear reactor that is cooled by pressurized water, which fuel assembly is generally designated 1, in an operative position in the core of the nuclear reactor between a lower core plate 2 and an upper core plate 3.

The fuel assembly 1 comprises a framework that is principally constituted by spacer grids, such as 4a and 4b, that bring about the maintenance of fuel rods 5 of the fuel assembly in the form of a cluster, in which the rods are all parallel with each other and are maintained in transverse directions inside cells of the spacer grids that are arranged in accordance with a regular network having square meshes. The framework of the fuel assembly also comprises guide tubes 6 which have a length greater than the length of the rods 5, a bottom end-piece 7 and a top end-piece 8 that are fixed to the ends of the guide tubes 6 protruding axially relative to the ends of the cluster of rods 5.

The bottom end-piece 7 of the fuel assembly comprises a transverse square plate and feet 9 that are fixedly joined to the plate 7 in the region of each of the corners thereof. The fuel assembly 1, as can be seen in FIG. 1, rests on the lower core plate 2 by feet 9. Two of the feet 9 that are arranged along a diagonal of the square end-piece 7 are perforated by holes 10, in each of which there is introduced a centering pin 11 that projects at the upper surface of the core support plate 2, on which the fuel assembly is positioned, the pins 11 which are engaged in the holes 10 of two feet of the fuel assembly allowing the positioning and the centering of the fuel assembly to be brought about on the lower core plate 2. Holes for the flow of water extend through the lower core plate 2. Four water flow holes are generally arranged perpendicularly relative to each of the fuel assemblies 1 of the core of the nuclear reactor and open below the transverse plate of the bottom end-piece, through which calibrated water flow holes extend and bring about the distribution of the cooling water of the reactor between the fuel rods 5 of the cluster of the fuel assembly.

When the core of the nuclear reactor is loaded, the planar vertical faces which delimit the fuel assemblies 1 of parallelepipedal form with a square base are placed in adjacent positions, the external peripheral surfaces of the spacer grids of the fuel assemblies being substantially in contact.

The framework of the fuel assembly 1 also comprises a top end-piece 8 that is fixed to the upper end portions of the guide tubes 6. The top end-piece 8 of the fuel assembly that is illustrated in FIG. 1 comprises a frame 8a of square cross-section and a transverse plate that is fixedly joined to the frame 8a and through which holes for the flow of the cooling water of the fuel assembly extend.

At two corners of the square 8a that are arranged along a diagonal of the end-piece, there are arranged two holes 12 that are intended each to receive a centering pin 13 that projects under the upper core plate 3 of the nuclear reactor when the upper core plate 3 is positioned on the fuel assemblies loaded in the core.

At each of the sides of the frame 8a, there is positioned a set of leaf springs 14 that are intended to bring about the maintenance of the fuel assembly below the upper core plate 3. Each of the sets of leaf springs 14 is fixed to the frame 8a of the end-piece in the region of a corner of the frame 8a, the fixing of the four sets of leaf springs being brought about in the region of two corners of the frame that are arranged along the second diagonal of the frame 8a perpendicular to the diagonal along which the engagement holes 12 for the pins 13 of the upper core plate are arranged.

After the core of the nuclear reactor has been loaded, inside the chamber of the reactor, each of the fuel assemblies resting in a predetermined position on the lower core plate, the upper internal pieces of equipment of the nuclear reactor are again positioned above the core, comprising, in the lower portion thereof, the upper core plate whose guiding pins engage in the holes of the top end-pieces of the fuel assemblies. The leaf springs 14 are compressed by the weight of the upper internal pieces of equipment and by the clamping force brought about by closing the cover of the chamber, the compression forces being transmitted to the structure of the fuel assembly comprising the framework and the cluster of rods.

Using leaf springs in order to bring about the support of the upper core plate on the fuel assemblies is made necessary because there occur differential expansions between the structures of the nuclear reactor and the fuel assemblies when the temperature in the nuclear reactor rises up to the operating temperature. The differential expansions are absorbed by the compression springs 14 of the fuel assemblies.

During operation of the nuclear reactor, cooling water flows in the fuel assemblies at a very high rate so that the fuel assemblies are subjected to a hydraulic thrust in the vertical direction upwards, that is to say, in accordance with the direction of flow of the cooling water. In order to suppress or limit as much as possible the displacements of the fuel assemblies under the action of the hydraulic thrust, in particular in the transient operative phases of the reactor, leaf springs 14 are used that have excellent characteristics, that is to say, leaf springs that transmit great compression forces to the structures of the fuel assemblies. Using springs having excellent characteristics allows the vertical displacements of the fuel assemblies and the lateral vibrations to be limited or suppressed, which in particular allows violent shocks to be prevented with respect to the bottom end-pieces of fuel assemblies on the lower core plate, after the fuel assembly has been raised under the action of the hydraulic thrust.

With a view to limiting the compression forces applied to the fuel assemblies of the core of a nuclear reactor, it has been envisaged to produce forces counter to the vertical displacement of the fuel assemblies under the action of the hydraulic thrust, in order to supplement the maintenance springs.

According to the invention, the limitation of the compression loads acting counter to the hydraulic thrust is brought about by producing mechanical friction between the centering pins of at least one of the lower and upper plates of the core inside the through-holes of at least one of the end-pieces of the fuel assemblies.

The method according to the invention allows new assemblies, or even used assemblies, to be constructed or modified in order to bring about a substantial reduction or suppression of the vertical displacements and lateral vibrations of fuel assemblies in the core of the nuclear reactor under the action of the hydraulic thrust, while at the same time substantially limiting the maintenance loads applied to the fuel assembly.

Figure 2:
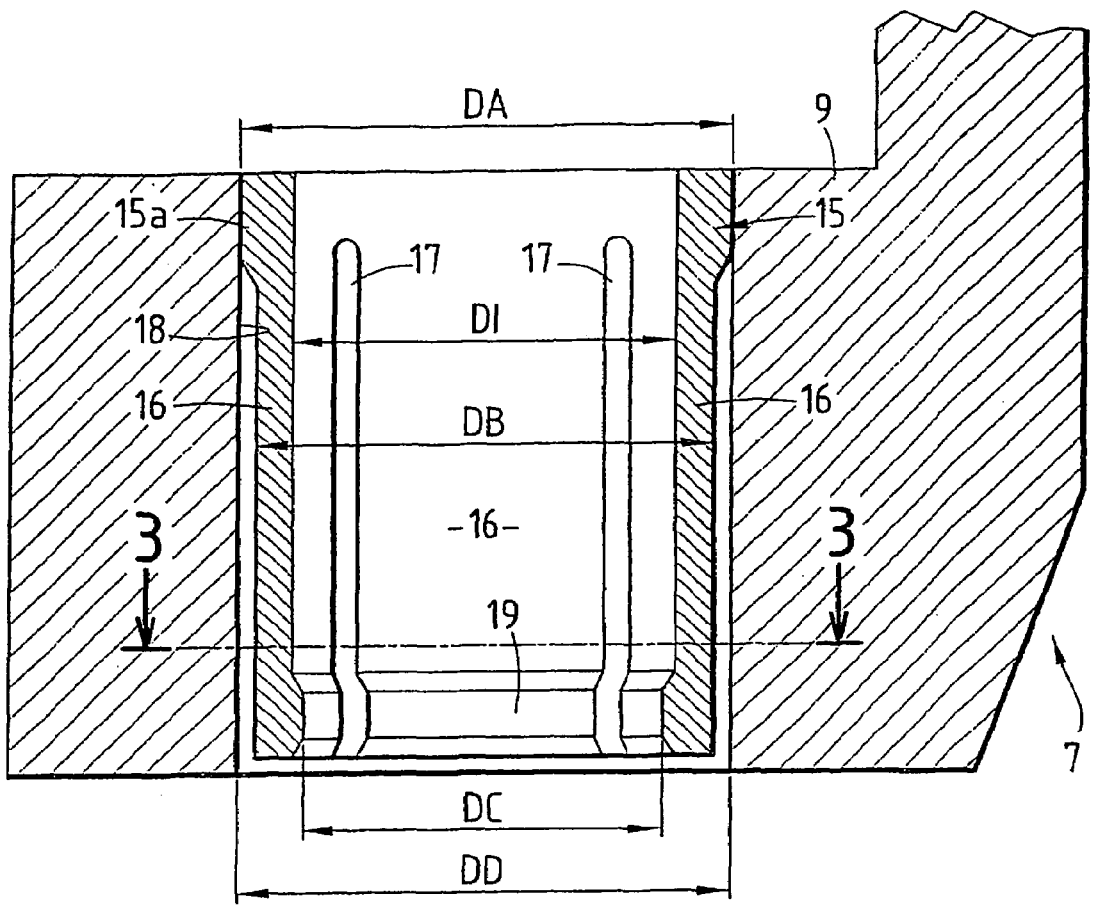
FIG. 2 is an axially sectioned view of a resilient bush which is mounted in an end-piece of a fuel assembly when the method according to the invention is carried out.
Figure 3:
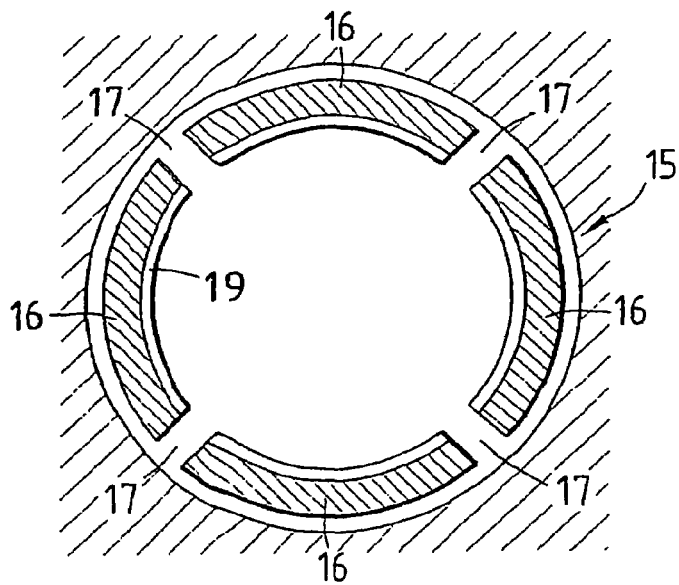
FIG. 3 is a cross-section along 3-3 of FIG. 2.

FIGS. 2 and 3 relate to performing the method according to the invention by braking the fuel assembly in the region of the bottom end-piece thereof.

FIG. 2 illustrates a portion of a foot 9 of a bottom end-piece of a fuel assembly that is intended to rest on the lower core plate of the nuclear reactor.

The limiting method according to the invention consists in introducing and fixing, inside a hole that extends through the foot 9 of the bottom end-piece, a resilient bush 15 that is intended to receive, in its internal hole, a centering pin of the lower core plate of the nuclear reactor.

The resilient bush 15 is constructed as a split bush comprising four flexible arms 16 that are separated from each other by four apertures 17 having an axial direction extending over a portion of the length of the flexible bush 15.

The flexible bush 15 comprises a fixing portion 15a inside a hole 18 that extends through the foot 9 of the bottom end-piece of the fuel assembly. The fixing portion 15a of the resilient bush is arranged at one of the axial ends of the bush 15 and extends over an axial length that may be, for example, on the order of from 10% to 20% of the total axial length of the resilient bush. The resilient arms 16 and the apertures 17 of the bush extend over the remaining portion of the bush between the fixing portion 15a and a free end of the flexible arms 16.

The outer diameter of the tubular bush, in the fixing portion 15a thereof, is substantially equal to the diameter DA of the hole 18 in the upper portion of the foot 9 of the end-piece.

As illustrated in FIGS. 2 and 3, the bush is fixed inside the hole 18 of the end-piece. The bush 15 can be fixed in the hole 18 of the foot 9 of the end-piece either by force-fitting or crimping, or by welding in the event that the materials that constitute the foot 9 of the end-piece and the resilient bush 5 are metallurgically compatible.

In the case of the construction of a fuel assembly 9, the diameter DA of the hole 18 and therefore the outer diameter of the fixing portion 15a of the resilient bush 15 can be selected so as to be able to position a bush 15 having a predetermined wall thickness taking into consideration the diameter of the guiding pins of the lower core plate. In all cases, naturally, the diameter of the hole 18 is greater than the diameter of the guiding pins that must be introduced inside the resilient bush 15 that is fixed in the through-hole 18 of the foot 9 of the bottom end-piece.

In the case of an existing fuel assembly, for example, a new fuel assembly of conventional type or a used fuel assembly, the feet 9 of the bottom end-piece of the fuel assembly are perforated by holes having a diameter which is only slightly greater than the diameter of the guiding pins of the lower core plate. In that case, in order to position a bush 15 having optimised dimensions, re-boring of the hole of the foot of the end-piece is performed in order to obtain a hole 18 in which it is possible to fix the bush 15 by its fixing portion 15a.

The bush 15 comprises, at a free end of each of the resilient arms 16 thereof, remote from the portion for connecting the resilient arm 16 to the fixing portion 15a of the bush, a rim 19 that projects radially towards the inner side of the bush, the four rims projecting from the four resilient arms 16 constituting a discontinuous, substantially annular supporting portion 19.

The geometric characteristics of the bush that define the clamping and therefore the friction force on the clamping finger that is engaged in the bush comprise in particular the outer diameter DB of the resilient arms of the bush, the inner diameter DC of the resilient arms of the bush, in the region of the supporting surface 19 of annular form with respect to a centering pin that is introduced in the resilient bush 15 and the diameter DD of the portion of the hole 18 opposite the free end portion of the resilient arms 16 of the bush 15.

Generally, the diameter DD is equal to the diameter DA, the hole 18 extending through the foot of the end-piece having a constant diameter. However, it is possible to provide the hole 18 with a different diameter in the fixing zone of the bush and in the portion which receives the resilient arms 16.

The inner supporting diameter DC of the resilient arms must be equal to the outer diameter of a centering pin of the lower core plate less a gripping value which can be calculated in accordance with the friction load desired in the vertical direction between the centering pin and the flexible bush. The gripping calculation must take into consideration the length and the radius of the flexible arms and the lateral vibration loads to which the fuel assembly is subjected.

The inner diameter DI of the resilient bush 15, outside the supporting portion 19, is greater than the diameter of the centering pins of the lower core plate so as to take into consideration the unknown variables relating to the position of the centering pins of the fuel assembly.

In order to limit the movement between the bush and the centering pin of the lower core plate in an accident situation, it is possible to calculate the diameter DD of the portion of the hole 18 located opposite the flexible arms in accordance with the outer and inner diameters of the flexible arms by means of the following formula:

$$DD=DB+DI-DC.$$

In this manner, the diametrical play around the flexible arms 16 of the bush 15 is equal to the maximum displacement of the arms 16 that have been deformed by flexion when a centering pin is introduced in the bush 15. The support between the bush 15 and the centering pin that is brought about in the region of the supporting surface 19 adjacent to the free ends of the flexible arms 16 and located immediately beside the supporting surface of the foot 9 on the lower core plate further allows prevention of stresses in terms of flexion on the centering pin. In the case of transverse stress under accident conditions, due to the value selected by the above-mentioned calculation of the diameter DD, the flexible arms 16 are in abutment against the inner surface of the hole 18 and the centering pin is not urged in terms of flexion because it is maintained by a portion of its surface adjacent to the lower core plate.

The calculation and establishment of the diameter DD allows construction of the hole 18 by machining or by re-machining the feet of the bottom end-piece of the fuel assembly.

In order to obtain a substantial limitation of the compression forces to be applied to the fuel assembly in order to ensure maintenance thereof, it may be necessary to position resilient bushes both in the holes of the bottom end-piece of the fuel assemblies and in the through-holes of the top end-piece. In that case, the braking is brought about both at the surface of the guiding pins of the lower core plate and at the surface of the pins of the upper core plate.

The construction and mounting of resilient bushes, that can be positioned in the holes 12 of the frame 8a of the top end-piece of a fuel assembly, will not be described, the mounting of resilient braking bushes in the holes of the top end-piece being brought about in a manner similar to the mounting of resilient bushes in the through-holes of feet of the bottom end-piece of the fuel assembly.

The resilient bushes 15 can be constructed from a material that has a high elastic limit and that is only slightly sensitive to plastic flow. It is possible to use in particular nickel alloys, such as alloy 750 or alloy 718, a martensitic stainless steel, such as steel Z12CN13, or titanium or one of its alloys. Since the end-pieces of fuel assemblies are generally composed of an austenitic stainless steel, the fixing of the resilient bushes by shrink-fitting in the through-holes of the end-pieces may present some problems because the resilient materials envisaged for the bushes have expansion coefficients that are less than those of austenitic steels. In some cases, it is possible and preferable to bring about the connection between the resilient bush and the end-piece by welding. In other cases, it may be necessary to use a screw type assembly between the resilient bush and the end-piece, with securing of the screwed assembly being provided in order to make the resilient bush incapable of being unscrewed.

Using resilient bushes such as the bushes described above allows friction loads of a few hundreds of daN to be obtained per end-piece and, for example, of from 300 to 400 daN per assembly.

Obtaining such axial friction loads between the fuel assembly and the centering pins of the assembly allows a considerable reduction in the compression load to be applied to the fuel assembly. The reduction in the compression load obtained can thus be of 50% or more, that allows a lighter structure for the fuel assembly.

Figure 5:
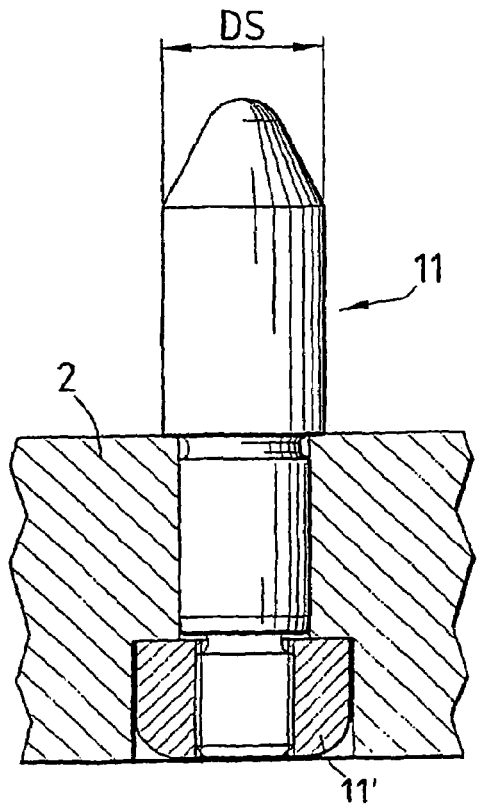
FIG. 5 is a partially sectioned front view of a centering pin of the lower support plate of the core of a nuclear reactor.

FIG. 5 illustrates a pin 11 that is fixed to the lower core plate 2 by a nut 11' that is screwed onto a threaded portion of the centering pin 11 that is engaged in a hole which extends through the lower core plate 2.

Figure 4A:
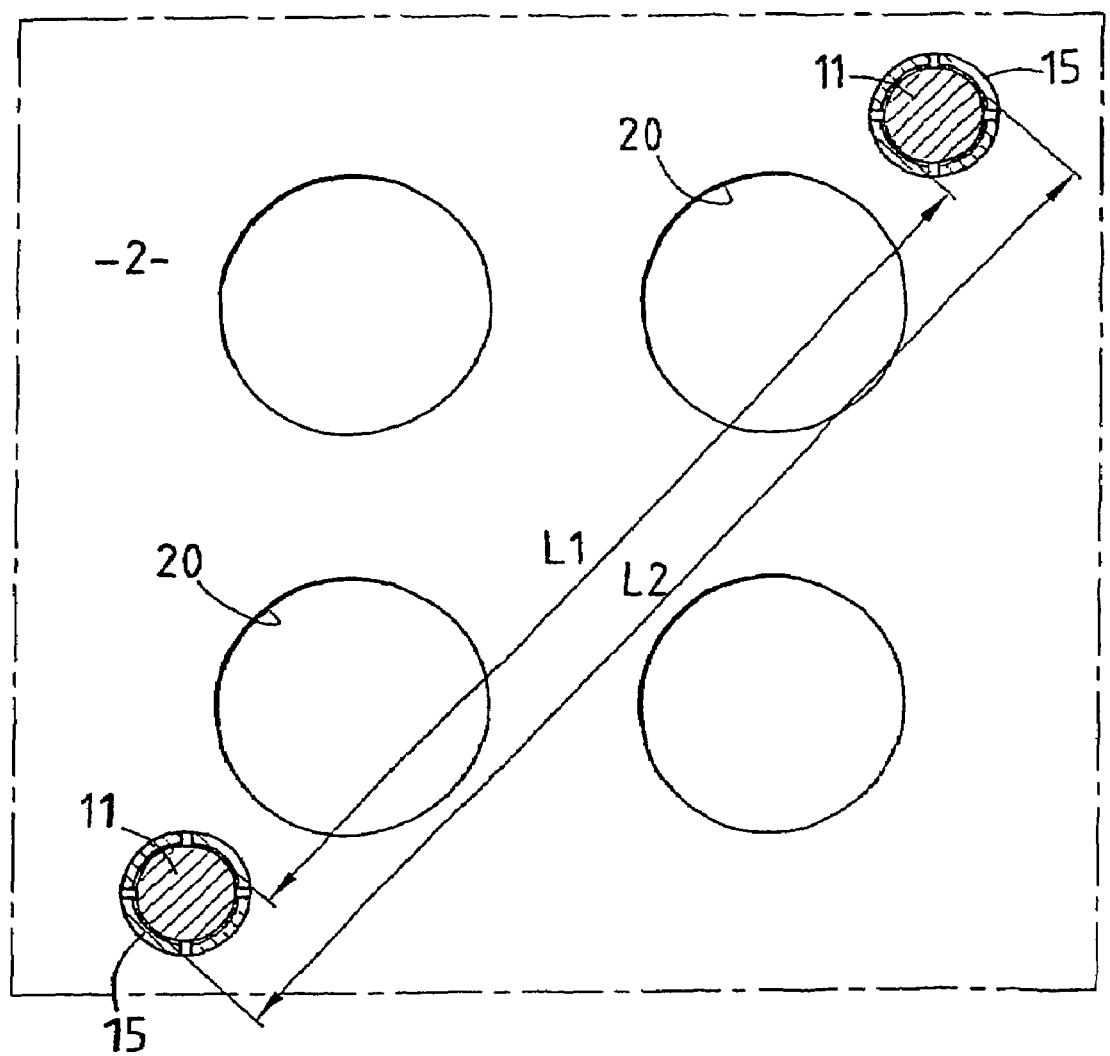
FIGS. 4A and 4B are top views of centering pins of the lower core plate of a reactor, which pins are introduced in two resilient bushes of a bottom end-piece of a fuel assembly.

As provided in FIG. 4A, two pins 11 are fixed to the lower core plate 2 perpendicularly relative to each of the fuel assemblies in arrangements allowing them to be engaged in two holes of the bottom end-piece of the fuel assembly.

The pins 11 are arranged on the lower core plate at one side and the other of two water flow holes 20 that are intended to bring about the flow of supply water to the fuel assembly.

FIG. 4A further illustrates two resilient bushes 15 according to the invention that have previously been engaged in the bottom end-piece of the fuel assembly that is intended to rest on the lower core plate in the position illustrated in FIG. 4A, the resilient bushes 15 which are fixed inside the through-holes of the end-piece, as described above, engaging with the pins 11. In order to bring about engagement of the resilient bushes 15 with the pins 11 under satisfactory conditions, that is to say, without applying excessive flexion loads to the pins 11, it is necessary to take into consideration, when the resilient bushes are constructed and fixed in the end-piece of the fuel assembly, the tolerances permitted with respect to the diameter DS (see FIG. 5) of the cylindrical portion of the centering pin 11 and the distances L1 and L2 between the generating lines which are closest to and the generating lines which are furthest away from the cylindrical surface of the centering pins.

There has been produced a pattern of all the pins of the lower core plate of a nuclear reactor and the maximum variation distributions of the parameters DS, L1 and L2 were established.

The inner diameter DI which it is necessary to provide for the resilient bushes has been calculated therefrom.

As described above, the diameter DD of the hole which extends through the end-piece and which must be provided or re-machined in order to mount the bush 15 is calculated therefrom.

The resilient bushes 15 must further be mounted, for each of the fuel assemblies, in an orientation allowing both ready centering of the bush to be brought about relative to the pins 11 of the lower core plate 2 and good clamping of the bushes which brings about a friction force allowing the compression force to be applied to the fuel assembly to be substantially reduced.

Figure 4B:
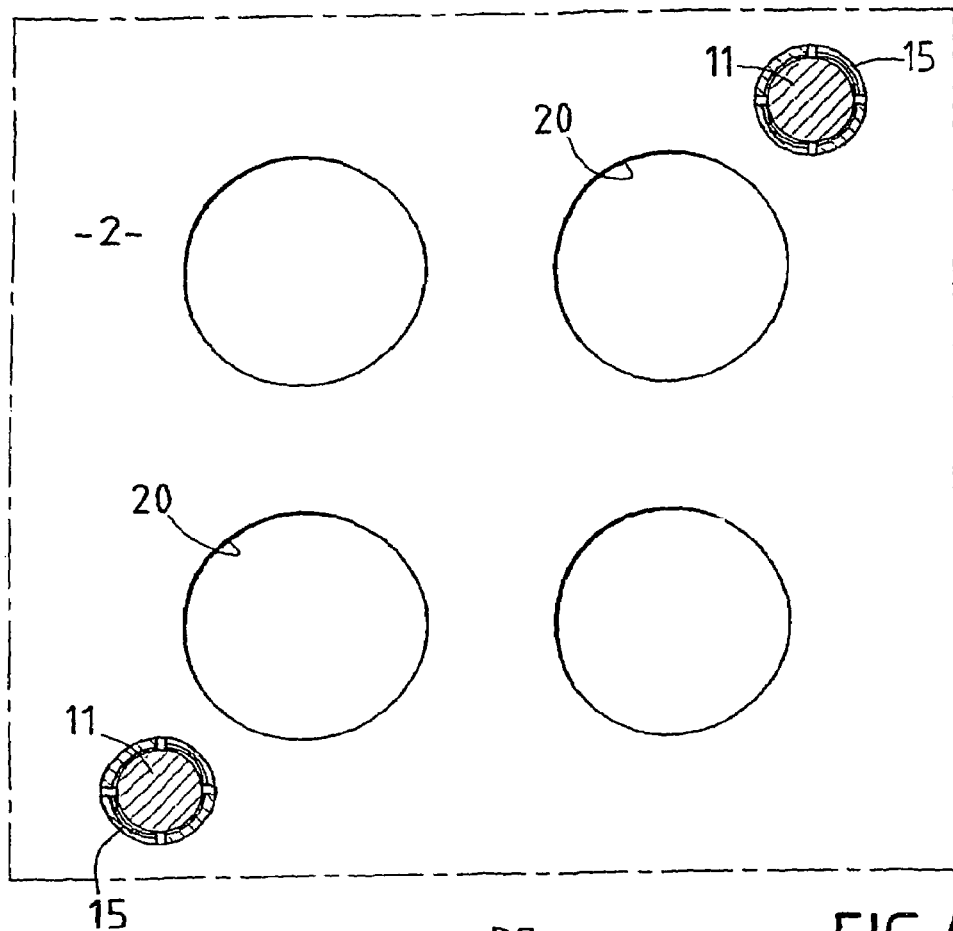

These two contradictory objectives may be reconciled, as illustrated in FIG. 4B, using bushes having elliptical supporting surfaces and orientating the bushes in order to bring about more powerful clamping in the perpendicular direction relative to the diagonal along which the resilient bushes 15 are arranged.

Therefore, the invention allows the maintenance force necessary, and therefore the compression force acting on the structure of a fuel assembly, to be reduced simply and effectively, that allows lighter fuel assembly structures to be used.

The invention is not limited to the embodiments which have been described.

Thus, the resilient bushes may be of a different shape from that described above and the resilient bushes may be associated with any other means for braking the vertical displacements of the fuel assembly.

The invention can be applied to any type of nuclear reactor cooled by water.

The invention claimed is:

1. A method for limiting maintenance loads applied to a fuel assembly of a nuclear reactor in order to compensate for hydraulic thrust of cooling water passing through the fuel assembly during operation in the nuclear reactor, comprising:
providing a configuration for limitation of maintenance loads in a nuclear reactor, the configuration comprising the fuel assembly comprising a framework that contains a cluster of fuel rods parallel with each other and that is closed at ends by transverse end pieces that are perpendicular to a longitudinal direction of the fuel assembly in which the cooling water flows, each of the end pieces comprising at least two axial centering through-holes that are intended each to receive a centering pin of one of a lower core support plate and an upper core plate, wherein a resilient bush is configured for frictionally engaging the centering pin, for at least one centering hole, of at least one of the end pieces of the fuel assembly, the resilient bush comprising an annular member having a fixing portion which is in contact with the centering hole of the end piece, over a portion of an axial length thereof, at least two flexible arms that are separated from each other by at least two apertures of axial direction over another portion of the axial length of the resilient bush, between the fixing portion thereof and a free end of the bush, the portion of the bush comprising the flexible arms having an outer diameter smaller than the diameter of the centering hole and an annular supporting surface that projects radially inside the bush in the free end portion of the flexible arms that have an inner diameter that is smaller than the diameter of the centering pins wherein the centering hole of the at least one end piece of the fuel assembly is constructed to have a diameter that is substantially equal to the outer diameter of the fixing portion of the resilient bush, and wherein the resilient bush is fixed in the through-hole of the at least one end piece.

2. The method according to claim 1, wherein the resilient bush is fixed in the hole of the end piece of the fuel assembly by at least one of crimping, expansion-rolling, welding and screwing.

3. The method according to claim 1, wherein the resilient bush is fixed in the through-holes of one of the end-pieces of the fuel assembly and preferably in the through-holes of the bottom end-piece.

4. The method according to claim 1, wherein the resilient bushes are fixed in the through holes of each of the top and bottom end pieces of the fuel assembly.

5. The method according to claim 1, wherein the resilient bushes are constructed to have an inner diameter that is greater than a diameter of a cylindrical engaging portion of the centering pins in order to take into consideration tolerances with respect to the diameter of the cylindrical engaging portion of the centering pin and the spacing between the centering pins that are intended to be engaged in the end piece of the fuel assembly.

6. The method according to claim 1, wherein supporting surfaces are provided in elliptical shape and support surfaces of circular form for contact with the centering pin at the annular supporting surface inside the bush, to optimize contact and friction of the centering pin with the supporting surface of the resilient bush during displacements of the fuel assembly in a vertical direction under action of the hydraulic thrust.

7. A fuel assembly of a nuclear reactor comprising:
a framework having a cluster of fuel rods parallel with each other and that is closed at ends by transverse end-pieces that are perpendicular to the longitudinal direction of the fuel assembly in which cooling water flows, each of the end-pieces comprising at least two axial through-holes that each receive a centering pin of one of a lower core plate and an upper core plate;
a resilient bush that is fixed, inside at least one through-hole of at least one of the end-pieces of the fuel assembly, the bush comprising an annular member that has a fixing portion which is in contact with the through-hole over a portion of the axial length thereof;

at least two flexible arms that are separated from each other by at least two apertures of axial direction over another portion of the axial length of the bush located between the fixing portion and a free end of the bush, the two flexible arms having an outer diameter that is smaller than the diameter of the fixing portion and an annular supporting surface that projects radially inside the bush in a free end portion of the flexible arms that have an inner diameter that is smaller than the diameter of the centering pins that are inserted into the through-holes of the end piece.

8. The fuel assembly according to claim 7, wherein the through-holes of the end piece of the fuel assembly in which a resilient bush is fixed have a diameter that is substantially greater than the diameter of the centering pins, the diameter of the through-holes being determined by an equation $DD=DB+DI-DC$ wherein DD is the hole diameter of the through-hole of the end-piece, DI is an inner diameter of a flow portion of the resilient bush, DB is the outer diameter of the flexible arms of the bush and DC is the diameter of the internal supporting portion of the resilient arms of the bush.

9. The fuel assembly according to claim 7, wherein the inner diameter of the flow portion of the resilient bush is greater than the diameter of a centering pin to account for tolerances with respect to the diameter of the centering pins and the spacing of the centering pins that are inserted in the end-piece of the fuel assembly.

* * * * *